July 12, 1955    J. W. BRADY ET AL    2,712,966
DOUBLE ROW BEARING

Filed Feb. 28, 1952    2 Sheets-Sheet 1

INVENTOR
J. WILLIAM BRADY
ATTILIO R. SPICACCI
BY
*M. R. Gould*
ATTORNEY

July 12, 1955  J. W. BRADY ET AL  2,712,966
DOUBLE ROW BEARING
Filed Feb. 28, 1952
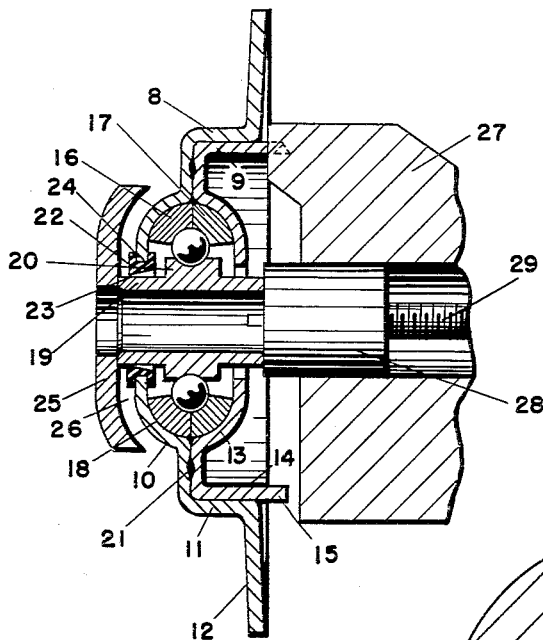
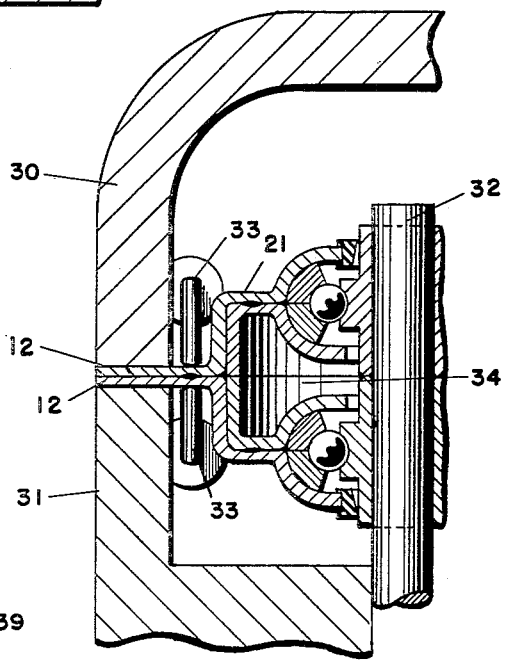
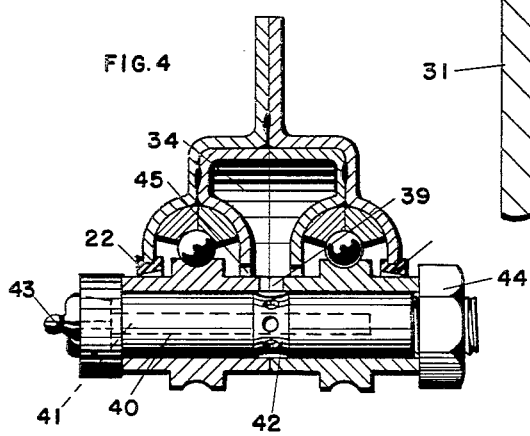
INVENTOR
J. WILLIAM BRADY
ATTILIO R. SPICACCI
BY
ATTORNEY

2,712,966

Patented July 12, 1955

2,712,966

DOUBLE ROW BEARING

Jarlath William Brady and Attilio Regulus Spicacci, Lancaster, Pa.

Application February 28, 1952, Serial No. 274,018

13 Claims. (Cl. 308—181)

This invention relates to inventions of the double row ball bearing type and to the method of making them.

The particular type of double row bearing which forms the subject of this invention is developed primarily for use in such farming implements as coulters and its main object is to provide a bearing which will be comparatively inexpensive to manufacture, be extremely rugged in construction, will need no lubrication for the life of the bearing, will be able to withstand exposure to moisture, mud, and be impervious against the infiltration of dry dust and to withstand the extremely hard usage to which it is subjected during its operation in the field.

Heretofore, the manufacture of double row bearings necessitated precision processes in order to make them operative. It is necessary that the two rows of bearings be adequately matched to avoid cramping or excessive looseness in the assembled bearing making it necessary to maintain very close manufacturing tolerances. In one case, both the raceways of the inner and those of the outer rings are made integral, making it necessary to grind the raceway grooves of one row with their proper location with respect to the other row. In the other case, either or both inner and outer rings are separate; the relative location of the grooves is obtained by grinding the butting ring faces. These procedures are costly and, where the bearing is for a coulter or some other product where extreme precision running is not essential, such manufacturing precision is prohibitive.

It is the object of this invention to provide a method of making a double row ball bearing without the necessary precision grinding or matching of the raceways and to eliminate the prohibitive cost in the manufacturing of double row bearings and so furnish bearings of the double row type which give adequate lateral rigidity at a cost which will permit them to be used in coulters or other implements.

It is a further objct of the present invention to make a double row ball bearing comprising two identical units of single row ball bearings which, when assembled by the method illustrated in this invention, will provide adequate matching raceways without the necessity of maintaining the close tolerances of previous manufacturing practices.

It is a further object to provide a double row bearing made from a pair of interchangeable single matching units which, when assembled by the present method, provide a bearing having lateral rigidity and formed with an interior lubricant retaining well carrying sufficient lubricant for the life of the bearing, thus doing away with relubrication in service.

It is a further object of the present invention to provide a double row bearing which may be adequately sealed against the infiltration of water, dust, or any foreign particles which would tend to interfere with the life or operation of the bearing, and which would include a construction adapted to withstand the shocks such as occurring by impact of the coulter with stones or other hard objects during the plowing operation.

It is a further object to provide a shock resisting shield so that the blows received on the shield will not affect the bearing in such a manner that the bearing will become damaged.

It is a further object of the invention to provide a double row bearing made from a pair of single identical units which forms a unitary assembly which may be fastened to the coulter disc or the like without using other accessories.

A further object of this invention is to provide a method of assembling a pair of single row bearings to form a double row bearing, the assembly operation adequately matching the bearing raceways.

The invention is illustrated in the accompanying drawings in which:

Figure 2 illustrates one method of bringing the inner bearing face flush with the corresponding butting surface of the outer ring.

Figure 3 shows one method of spot welding a pair of units together.

Figure 4 illustrates the upper half of the assembled bearing with the greasing fixture in position.

Figure 1:
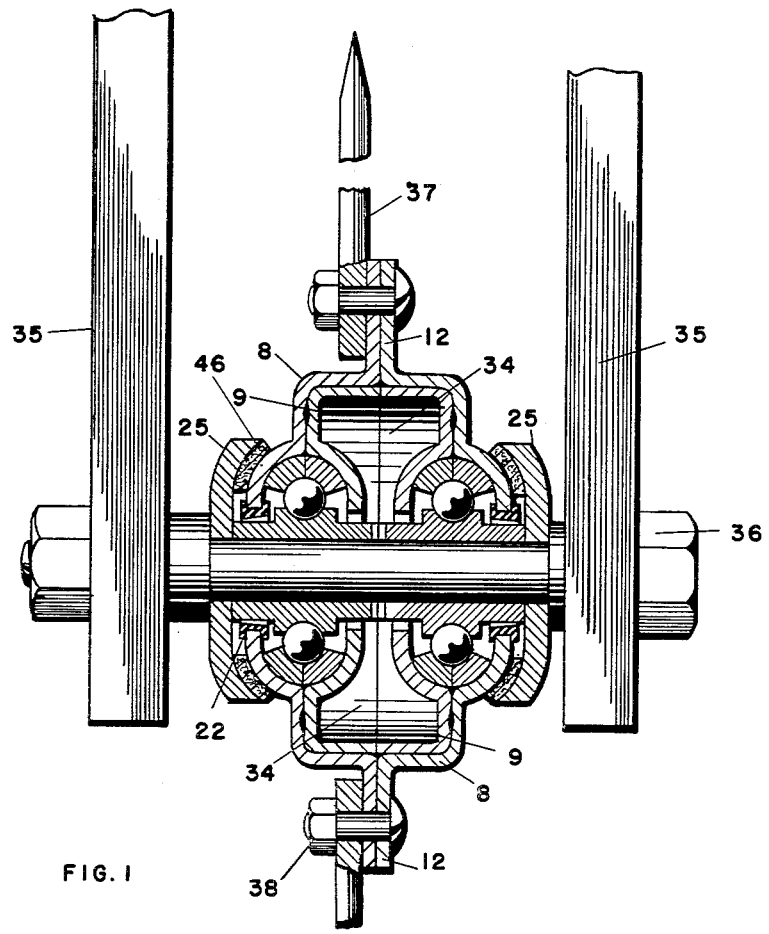
Figure 1 is a view of the bearing and coulter disc mounted in the supporting shafts with the bearing in cross section.

Referring particularly to Figure 2, a single unit having a single row bearing formed with a pair of plates, termed for convenience an outer plate 8 and an inner plate 9. These plates may be pressed from sheet steel in the form shown in Figure 2, with the outer shell having the quarter groove 10, the right angled central portion 11 and the outer rim 12. The inner plate is formed with the recess section 13 and the right angled portion 14, the recess portion 13 fitting with the portion 10 to form an annular groove in cross section, the right angled portion 14 bearing against the right angled portion 11 and extending beyond the edge of the rim 12, as shown at 15 in Figure 2. A raceway made up of two circular sections 16 and 17 fit in the annular groove 18.

An inner ring 19 has a raceway 20 which serves as an inner raceway for the ball bearing. In the assembling the two plates are pressed together and spot welded or riveted at 21 so that a complete unit which could be utilized as a single row ball bearing is formed. Along the outer opening of the plate a rubber like seal 22 formed with a lip bearing on the inner ring at an angle having its lower edge cut, as shown at 23, is formed with an exterior annular groove 24 which engages the rim of the outer shell, the inner edge of the seal engaging the surface of the hub to prevent the entrance of dust or dirt. A second shield 25 having a cork, felt or rubber gasket 26 bonded to the shield 25 and contacting with the surface of the plate serves to keep out the dust, dirt and water.

It is desirable to have this gasket so curved that initially its bearing surface is outward, that is at 46.

In this manner, the greatest pressure and deformation of the gasket is at the initial point of entry for the extraneous substances such as water, mud or dust.

The advantage of this construction lies in the greater sealing efficiency. Not only because the greatest pressure is in the outward rim of the gasket, but also because any small rocking existing in the bearing may cause a partial separation of the gasket and the bearing surface of the outer plate. By having a substantial elastic compression of the gasket at its outer rim, the tendency of separation is obviated for the reason that the elastic deformation causes the gasket to persist on its contact with the outer plate surface. The shield 25 is of tough material to withstand any blows or shocks which an implement such as a coulter may encounter during a plowing operation.

In the preparation of the single units for assembly to form the economically constructed double row bearing, the cutter 27 having a central gage 28 is brought into contact with the projecting edge 15 of the inner plate and said edge is cut so as to be in the same plane as the flat inner surface of the inner ring. This inner surface is contacted by the gage 28 which is adjustable by means of the screw 29 and serves as a stop for the cutter 27, so that upon the completion of the cutting operation the edge 15 of the plate and the inner edge of the hub are in the same plane parallel to the running path of the balls.

The bearing is then brought into contact with a similar bearing, as shown in Figure 3, by means of press fingers 30 and 31 engaging the rim 12 of the outer shell. This rim was originally formed slightly tapered away from the side of the bearing having the sealing washer to assure the meeting of the machined edge of the inner shell, but the pressure of 30 and 31 brings them flat together before the welding or riveting is accomplished. While the bearings are held in contact with the edges of the plate and the corresponding edges of the hubs in contact and aligned through the insertion of an aligning pin 32, electrodes 23 spot weld the rims 12 together. The completed bearing, completely aligned as to the hubs and now formed with a lubricant retaining compartment 34, is removed from the press.

Referring particularly to Figure 1, the completed bearing is shown mounted between the forks 35 of a supporting framework and firmly clamped by the bolt 36. The shields 25 receive the pressure of the bolt and transmit such pressure to the inner faces without creating any preloading on the two rows of balls. The coulter disc 37 is bolted directly to the welded rims of the outer plates of the bearings by bolts or rivets 38 which makes it possible to utilize the bearings a second time, merely replacing the coulter disc.

With reference to Figure 4, a grease compartment 34 which is sufficiently large to retain enough lubricant to last for the life of the bearing is formed when the inner plates contact and the rims of the outer plates are welded. The inner rings are formed with a slot 39 at the abutting faces and a bolt 40 having a longitudinal hole 41, an inner groove 42 communicating with said longitudinal hole and a grease gun fitting 43 makes it simple to fill the lubricant containing chamber 34 at the factory, the bolt being slid into the hubs and securely fastened by the nut so that grease may enter through the pressure grease fixture 43 and the notch 39. A central opening 45 between the inner shell and the hub allows the lubricant to enter the raceway compartment, while the seal 22 prevents the escape of the grease as well as the entrance of dust or dirt.

A double row bearing is thus formed from a pair of interchangeable single row bearings without the necessary precision grinding and without maintaining the usual necessary tolerances. The operation is an economical one and one which makes possible the use of a double row bearing in mounting a coulter. The double row bearing gives lateral rigidity to the coulter which is not possible through a single row bearing, while the formation of the plates of which the bearing is made provides a lubricant retaining chamber which will hold sufficient lubricant for the life of the bearing. At the same time the plates of the bearing form the rim to which the coulter disc is directly attached and also provide an outer surface against which a shield can be fitted to prevent the entrance of foreign matter.

Figure 5:
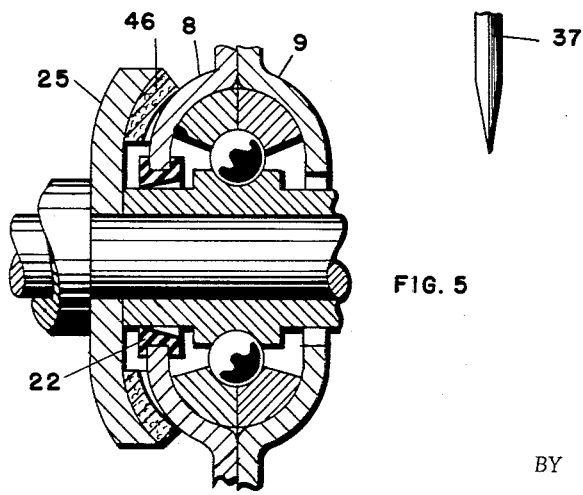
Figure 5 is a detail view showing the new type of washer used in combination with the bearing.

Referring particularly to Figure 5, a new type of sealing washer is used in combination with the bearing and is shown here before the nut 36 is tightened. The sealing washer 46 and the sealing washer 22 are both conically shaped on their inner surface so as to provide a contacting edge at the extreme limits of the sealing washer. A bearing of this type, no matter how tightly held, has a certain amount of movement and with the use of a straight washer the dirt works under the washer and eventually gets to the bearing. It has been found, however, with the new conical sealing washer, a separate patent application of which is filed concurrently, the dirt is stopped at the outside edge.

What is claimed is:

1. A double row ball bearing for coulters formed from a pair of identical single row bearings, comprising sleeves abutted in longitudinal alignment, said sleeves being formed with integral inner ball bearing races, outer ball bearing races, balls seated in and separating said races, a pair of plates in each single row bearing, each of said plates formed with a central semi-spherical depression and a central opening to receive the sleeve, said plates being joined with the depressions opposed to provide a housing for said outer race, one of said plates terminating in an annular rim, the other of said plates conforming to said rim and terminating in an annular lip at right angles to said rim to support a coulter, the rim terminating plates of each of said bearings being abutted to form a grease compartment, means permitting grease to flow from said compartment to said balls, means attached to the other of said plates to prevent the escape of grease from the race housing, and a guard overlapping the juncture of the outer of said plates with the sleeve and protecting said plate and sleeve.

2. A double row ball bearing according to claim 1, wherein the guard is provided with a resilient washer engaging the outer of said plates of each of said single row bearings to prevent the entrance of dirt and moisture.

3. A double row ball bearing according to claim 1, wherein the means for sealing the outer of said plates to the sleeve consists of a resilient washer secured to the outer plate and formed to initially engage its outer edge with the plate.

4. A double row ball bearing according to claim 1, wherein the abutting ends of the sleeves are formed with slots to permit the grease compartment to be filled with grease after the bearing has been assembled.

5. A double row bearing for coulters, comprising the welding together of two identical single row bearings, each of said single row bearings having balls, a sleeve having an integral inner race formed thereon, an outer race, a pair of plates, said plates being formed with central openings and substantially semi-spherical depressions around said openings, the plates being joined so that the depressions are opposed to each other to form a ball and race housing, said plates extending beyond said housing and being welded and bent to form an annular rim, one of said plates terminating in said rim, the other of said plates being bent again to form an annular flange for attachment to said coulters, said identical single row bearings being joined by abutting the sleeves and the edge portion of the rim terminating plates, to form a double row bearing.

6. A double row bearing according to claim 5, wherein the joining of the rim terminating plates of the identical single row bearings by abutting said rims forms a lubricant chamber communicating with said race and ball housing.

7. A double row bearing according to claim 5, wherein the joining together of said rim terminating plates of said identical single row bearings forms a lubricant containing compartment with communication to said race and ball housing, and means for sealing said housing on the ends opposite to said lubricant compartment.

8. A double row bearing for coulters, comprising a pair of identical single row bearings, each of said single row bearings having balls, a sleeve carrying an integral inner race ring, an outer race ring, a pair of plates having central openings and substantially semispherical depressions around said openings, said plates being joined so that said depressions are opposed to form a race and ball housing, said plates being welded at a point outward of said housing, said plates being further bent at right angles at a point beyond said housing to form an annular rim, one of said plates terminating in said rim, the other of said plates being bent to form an annular flange for attachment to said coulter, said identical single row bearings being joined by abutting the ends of the sleeve and the outward edges of the rim terminating plates to form an internal lubricant compartment, the abutting lines of the sleeves and the edges of the rim being in the same plane with the side of the annular flange, thereby providing an extended surface for joining said identical single row bearings together, communicating means between said lubricant compartment and said ball and race housing, and means for sealing said ball and race housing at each outer end opposite to the ends communicating with said lubricant compartment.

9. A double row bearing for coulters, comprising a pair of identical single row bearings, each single row bearing having balls, a sleeve having an integral inner race ring, an outer race ring, a pair of plates formed to provide a ball and race housing, one of said plates being bent to terminate in an annular rim, said single row bearings joined by abutting the annular rims of identical single row bearings so that the abutting ends of the sleeves of the inner races and the edges of the annular rims are in the same plane.

10. A double row ball bearing for coulters, comprising a pair of identical units joined to provide double the longitudinal extent of bearing support, each unit formed of a pair of plates having oppositely disposed central spherical depressions, an outer bearing race housed in the annular compartment formed by bringing the oppositely disposed central spherical depressions of the plates together, means for holding said plates together, one of said plates terminating in an annular rim, the other of said plates being bent to conform to said rim and terminating in an annular lip, said units being joined to abut the annular rims to form an internal grease compartment.

11. A double row ball bearing for coulters formed from a pair of identical units joined to provide greater lateral stability, each of said units comprising a sleeve bearing formed with a central annular inner raceway, a pair of plates joined to provide a housing, said plates formed at their inner ends with an annular groove which is semi-circular in cross section, the plates extending from said inner groove normal to the sleeve bearing and being welded to securely hold said plates together, the plates being bent at right angles to form an annular well, the inner of said plates forming the side wall of the well and the outer of said plates reinforcing the inner plate and thereafter bent at right angles to form an annular rim, a sealing washer carried by the outer plate and contacting at its outside edge with the sleeve bearing, a raceway carried in the inner groove formed by the joining of said plates and cooperating with the annular raceway of the sleeve bearing, and balls carried between said raceways.

12. A combination of a double row ball bearing for coulters formed from a pair of identical units joined to provide twice the longitudinal bearing extent, each of said units comprising a sleeve bearing having an integral inner raceway, a pair of plates formed with central depressions joined to provide an annular housing, an outer raceway carried by said housing and cooperating with said integral inner raceway, balls carried between said raceways, said units being joined to bring said plates together to form a grease retaining compartment, one of said plates in each unit being extended to form an annular rim for attachment to the coulter, an arcuate shaped metallic guard formed with a central opening equal in diameter to an opening in the sleeve bearing, said arcuate guard extending to substantially cover the inner part of the outer of said plates to protect said plate against deforming impact, and a resilient washer carried between the outer of said plates and said guard to provide an effective seal against the entrance of dirt or moisture.

13. The combination of a double row ball bearing with a guard, according to claim 12 wherein the resilient washer is thicker at its outer edge than at its inner edge to insure outer edge contact.

References Cited in the file of this patent

UNITED STATES PATENTS

| | | |
|---|---|---|
| 1,427,320 | Philips | Aug. 29, 1922 |
| 1,861,205 | Bukolt | May 31, 1932 |
| 2,127,149 | Whitney | Aug. 16, 1938 |
| 2,594,810 | Schaub | Apr. 29, 1952 |